United States Patent
Narahari

[11] 3,751,066
[45] Aug. 7, 1973

[54] WHEEL SUSPENSION SYSTEM
[75] Inventor: Gattu Narahari, Marion, Ohio
[73] Assignee: Sycon Corporation, Marion, Ohio
[22] Filed: Sept. 1, 1971
[21] Appl. No.: 176,911

[52] U.S. Cl. ............................ 280/124 F, 267/19 R
[51] Int. Cl. ............................................. B60g 11/46
[58] Field of Search ................ 267/15 A, 18, 17 R, 267/19 R, 19 A, 52; 180/24.02; 280/124 F

[56] References Cited
UNITED STATES PATENTS
3,612,572 10/1971 Raidel .............................. 267/19 R
3,547,215 12/1970 Bird .................................. 280/124 F

*Primary Examiner*—Philip Goodman
*Attorney*—Calvin G. Couell and J. Herman Yount, Jr.

[57] ABSTRACT

An air suspension system for a wheeled vehicle and particularly for the auxiliary lift axle of a vehicle wherein a trailing arm supporting the axle is pivotably supported at one end to the frame with an air spring operatively connected to the other end of the arm and a cantilever leaf spring rigidly connected at one end to the arm and cooperating with a frame-supported link at its other end to form a mechanism which normally biases the axle to an elevated position and which, in the lowered position of the axle, serves both as an energy store for lifting the axle and as a means of shock absorption.

6 Claims, 4 Drawing Figures

INVENTOR
GATTU NARAHARI
BY Yount and Tarolli
ATTORNEYS

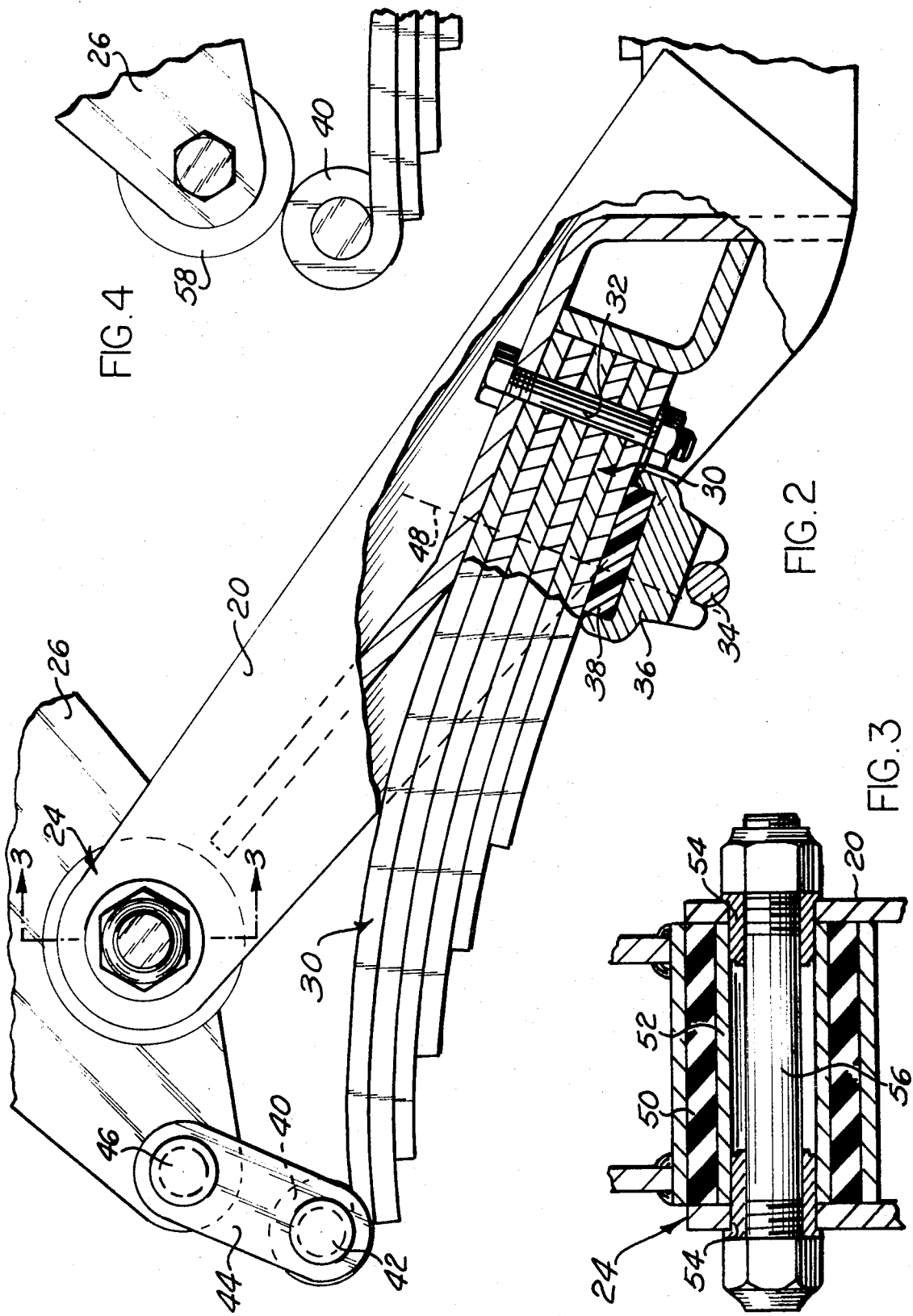

WHEEL SUSPENSION SYSTEM

This invention relates to wheel suspension systems and, more particularly, to a self-lift air suspension system for the pusher or trailing axle of a multiple axle vehicle.

The use of air suspension systems for wheeled vehicles is well known. Typically, these systems utilize air bags or air springs in lieu of the conventional leaf springs and these air springs, together with conventional shock absorbers, act to control the vertical movement of the axle and wheels. By varying the inflation of the air spring, variations in weight can be accommodated and the load carried by each axle can be adjusted. In addition, air suspension systems readily lend themselves to lift axles in which a tag or pusher axle is raised or lowered as need. With an axle lifting arrangement, the air spring provides a means for lowering the axle simply by inflating the spring thereby moving the axle down to a position where the wheels engage the road. To lift the axle, either a mechanical arrangement or air pressure may be utilized. U.S. Pat. No. 3,285,621 illustrates a mechanical arrangement utilizing a stressed leaf spring for raising the axle when it is not in use. Where air lift of the axle is employed, it is conventional to use a second inflatable device for lifting the axle.

Various design considerations and safety requirements have posed considerable problems in the development of a satisfactory air suspension system. In general, air suspension systems, as well as any other type of suspension system, must provide not only satisfactory control over vertical movements, but also provide satisfactory roll or lean stability for the vehicle. In addition, the system should be constructed to accept substantial braking torque and high frequency shocks and should accommodate a certain limited amount of differential vertical movement of the wheels on the axle. Further, with vehicles where air suspension systems are optional equipment, it is of substantial importance that the system be low cost, adapted for both high and low frame heights and radially installed so that the time and labor involved in the installation is maintained at a minimum.

This latter aspect is particularly important in an air suspension system for lift axles since these are frequently add-on items installed as a separate unit. In the air lift systems previously proposed the cost factor has been particularly significant since these systems require an additional inflatable air bag together with additional valving and pressure conduits, all of which increase both the cost of the system and the cost of installing the system.

It is the principal object of this invention to provide an improved air suspension system for lift axles which meets the foregoing design considerations and which overcomes the problems heretofore encountered with such systems.

A further important object of this invention is the provision of an air suspension system which may be pre-assembled and installed as a unit thereby effecting a significant savings in labor and time of installation.

These specific objects, as well as others, are achieved by an air suspension system which includes a trailing arm supporting the axle with one end of the arm being pivotedly supported on the frame and the other end of the arm being operatively connected to an inflatable air spring with the air spring being operable upon inflation to pivot the arm downward to a position where the wheels supported on the axle engage the ground surface. A cantilever leaf spring is rigidly connected at one end to the trailing arm adjacent to the pivotal support of the arm with the other end of the leaf spring operatively acting on the frame in such manner that the leaf spring normally biases the trailing arm, and hence the axle, to an elevated position. The leaf spring serves as a store of energy when the axle is lowered for automatically lifting the axle when the air spring is deflated and also provides schock absorption characteristics which eliminates the need for separate shock absorbers.

Other objects, features and aspects of the invention will be more apparent upon a complete reading of the following description which, together with the attached drawings, discloses but a preferred form of the invention.

Referring now to the drawings wherein like reference numerals indicate like parts in the various views:

FIG. 2 is an enlarged view partially in section, of the encircled portion of FIG. 1.

FIG. 3 is a sectional view along line 3—3 of FIG. 2.

FIG. 4 is a fragmentary view of a modified form of connection between the cantilevered end of the leaf spring and the frame.

Figure 1:
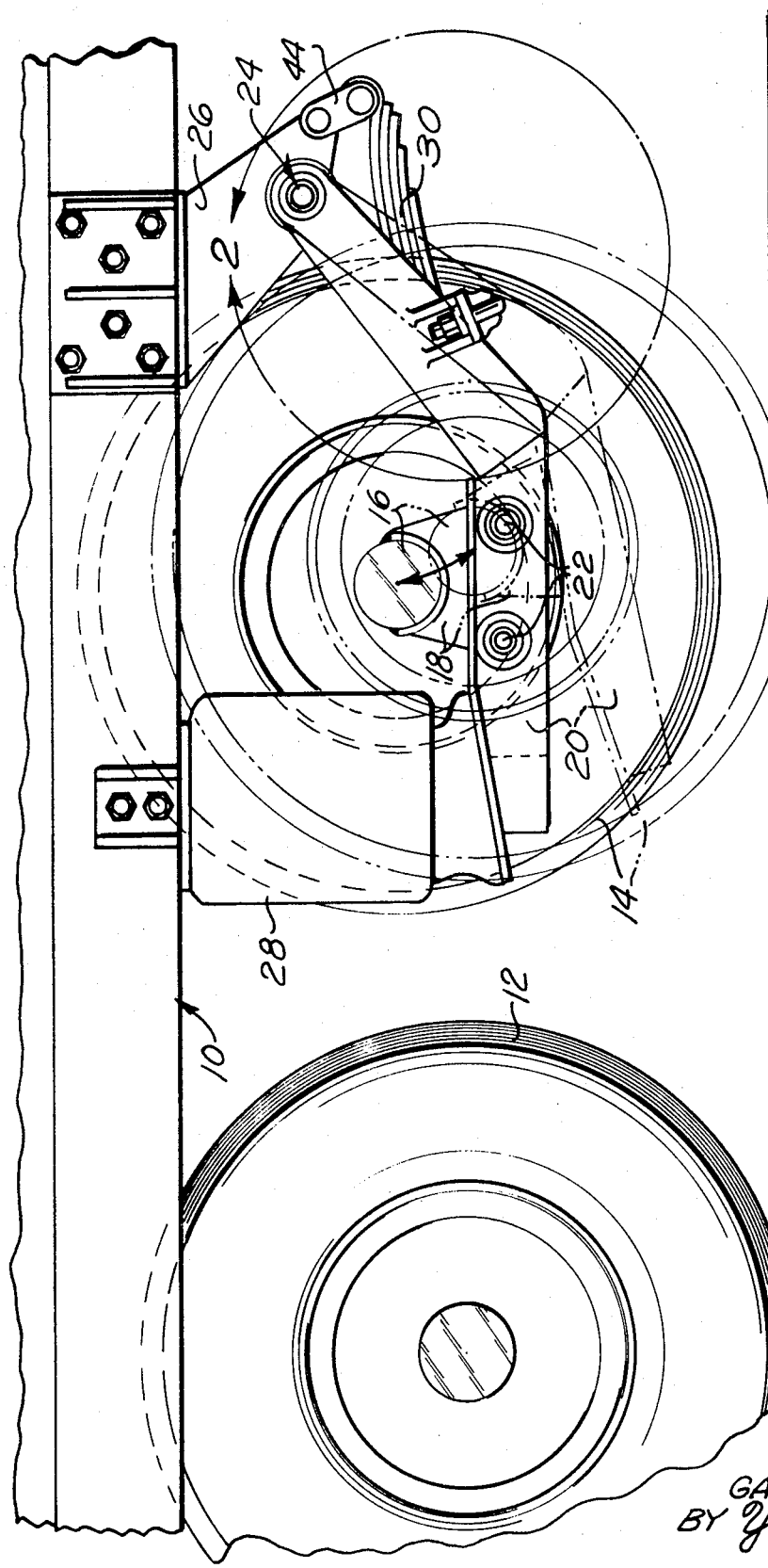
FIG. 1 is a fragmentary side elevational view of a vehicle having an axle supported by the suspension system of the present invention.

Referring now more in detail to the drawings, there is illustrated in FIG. 1 a fragmentary portion of a vehicle and which includes a frame 10. Supported on the frame of the vehicle are a pair of wheel sets 12, 14 arranged in tandem relationship. The rear set of wheels 12 is, which may be on the drive axle of a truck, supported by any conventional means on the vehicle while the forward set of wheels 14 are illustrated as being supported on a pusher axle 16 which is selectively movable between an elevated position and a ground engaging position.

The axle 16 is supported at both of its ends by a suspension system of the type shown in FIG. 1 and it will be understood that the following description applies to both ends of the axle. As shown, axle 16 is supported by an axle bracket 18 which, in turn, is supported on a trailing arm 20 by connection bolt assemblies indicated generally at 22. One end of the trailing arm is pivotedly supported by a pivot bolt assembly 24 on a frame bracket 26 which is rigidly connected to the frame 10. The other end of the trailing arm 20 is operatively connected to an air bag or air spring 28 supported from the frame 10. The air spring, together with the controls for selectively inflating the air spring, are conventional and, for simplicity of description, the details of these components have been omitted.

Acting between the frame and the trailing arm 20 is a leaf spring 30. As best viewed in FIG. 2, the leaf spring is supported in cantilevered fashion on trailing arm 20 by suitable means such as bolts 32. A U-bolt 34 and a U-bolt retainer 36 clamp the leaf spring to the trailing arm 20 adjacent the rigid connections provided by the bolts 32. A high strength elastomer such as a polyurethane rubber pad 38 is positioned between the U-bolt retainer 36 and the leaf spring.

The cantilevered end of the leaf spring 30 is provided with a connecting eye portion 40 with a pin 42 carried by one end of a deflector link 44 passing through the eye 40. The other end of the deflector link 44 is pivotally connected at 46 to the frame bracket 26. In assembly, the leaf spring 30 is preloaded so that it normally biases the trailing arm 20 to an elevated position in which the wheels 14 are separated from the ground.

It is to be noted that the leaf spring-trailing arm arrangement depicted in FIG. 2 forms a kinematic chain which would appear to consist of essentially three links and three revolute pairs or pivot pins. One link is the frame bracket 26, the second is the deflector link 44 and the third link consists of the combined trailing arm 20 and the leaf spring 30 rigidly connected to the trailing arm. The three pin-joints are those at 24, 42 and 46. It is known from well established principles of mechanics that a construction having three links and three revolute pairs has no freedom of movement or mobility and is, therefore, properly classified as a structure rather than a mechanism. However, by utilizing a flexible member such as the leaf spring 30 in the kinematic chain, the three link structure of FIG. 2 functions as a four link mechanism to provide mobility in one plane. More particularly, the cantilevered support of the leaf spring 30 permits the leaf spring to behave as two separate links joined by a pin-joint at a distance from its free end. This distance, which in the case of a leaf spring is at approximately three-fourths of its length, corresponds to the point about which the free end will pivot or deflect as the leaf spring deflects. Hence, a kinematic analysis of the arrangement of FIG. 2 demonstrates that the construction has the equivalent of four links and four revolute pairs and, therefore, functions as a mechanism. Thus, the four links are the deflector links 44, the frame bracket 26, the combined trailing arm 20 and the portion of the leaf spring to the line 48, and the portion of the leaf spring from the line 48 to the free end of the spring. The four pivot pins include pins 24, 42, 46 and the equivalent "pin-joint" represented by the line 48 about which the free end of the spring deflects.

In operation, the suspension system operates in the following manner. With the air spring 28 deflated, the axle 16 and wheels 14 are in the position shown in solid lines in FIG. 1 with the pre-loaded leaf spring 30 maintaining the wheels in the elevated position. When it is desired to lower the axle 16, the operator inflates the air spring 28 which acts on the end of the trailing arm 20 to pivot the trailing arm about the pivot assembly 24 and against the bias of the spring 30 to move the axle 16 downward until the wheels engage the ground. By varying the inflation pressure of the air spring, the operator can adjust the load which the axle 16 will be carrying. As the trailing arm 20 is pivoted, the rigidly connected end of the leaf spring 30 will pivot through an arc about the pivot point 24. This pivoting movement of the spring 30 is accommodated at the free end of the spring by the pivoting movement of the deflector link 44 about the pivot point 46. However, because of the connection between the spring 30 and the pivot pin 42, the movement of the cantilevered end of the spring 30 is about the pivot point 46. The differential in pivoting movements between the trailing arm 20 and the deflector link 44 result in a deflection of the leaf spring 30 which further stresses the spring and progressively compresses the pad 38. As a result of this deflection, energy is stored in the spring. On deflating the air spring 28, the stored energy in spring 30 is released and acts to pivot the trailing arm 20 upward toward the frame thereby separating the wheels from the ground.

To minimize noise transmission and absorb high frequency shocks, the bolts 22 connecting the axle bracket 18 to the trailing arm 20 are provided with rubber bushings. The rubber bushings at these connection points also introduce a certain limited amount of flexibility in the support of the axle 16 without detracting from the roll or lean stability of the suspension system. This limited flexibility permits one end of the axle to move in the plane of the axle relative to the other end of the axle so that a very small amount of differential vertical movement between the wheels on the same axle is permitted.

A similar type of connection is provided at the pivot point 24. This connection is illustrated in FIG. 3 wherein a cylindrical rubber bushing 50, together with a tubular support 52 and adapters 54, support the end of the trailing arm 20 on the pivot pin 46.

FIG. 4 illustrates an alternative arrangement for supporting the cantilevered end of the leaf spring 30. As shown in that Figure, the deflector link 44 has been eliminated and the eye 40 of the leaf spring rests directly against a roller 58 which is rotatably supported on the frame bracket 26. The preloading of the spring 30 is such that the eye 40 is at all times biased up into engagement with the roller 58 both when the axle is elevated and in the down position. The cooperation of the eye 40 with the roller 58 is the equivalent of the deflector link 44 and the pivot points 42, 46 in that the eye 40 moves about the roller 58 as the axle is being lowered in the same manner as described in connection with the embodiment of FIG. 2.

The described suspension system has several advantages which should be noted. Of primary importance is the simplicity of construction of the system. Through the use of the leaf spring and trailing arm combination, the need for separate shock absorbers in the system has been eliminated with the interleaf friction of the leaf spring functioning as a shock absorbing device. Moreover, this same combination has eliminated the need for any separate lift mechanism such as a second inflatable air bag for lifting the axle to the elevated position. Still further, the construction of the system is such that it comprises an essentially pre-assembled unit which can be readily installed on the vehicle simply by attaching the frame bracket 26 and the air bag 28 to the frame 10 together with hooking up the necessary air connections. This ease of installation significantly decreases the time and labor involved in making such an installation.

In addition, it will be noted that the system is adapted for use with a wide range of different types of vehicles. For example, the system can be installed in a vehicle having a relatively low frame height since additional space beneath the frame, over and above what is normally available, is not required to accommodate any of the components of the system.

It will be appreciated that the suspension system may be used either in the pusher position in front of the drive axle or in the trailing position behind the drive axle of a truck or it may be used on trailers.

While the invention has been described with reference to certain specific embodiments, neither the illustrated embodiments nor the terminology employed in describing them is intended to be limiting; rather, it is intended to be limited only by the scope of the appended claims.

Having thus described the invention, what is claimed is:

1. A wheel suspension system for a wheeled vehicle having a frame, an axle and a wheel supported on said axle, said system including,
rigid arm means supporting said axle,
means pivotedly supporting one end of said arm means on said frame whereby said arm means is supported for pivotal movement toward and away from said frame,
air spring means supported on said frame and operatively connected to said arm means, and
biasing means acting between said frame means and said arm means and normally acting to bias said arm means toward said frame,
said biasing means comprises leaf spring means rigidly connected at one end to said arm means, and
means movably supporting the other end of said leaf spring means on said frame,
said latter means comprises linkage means pivotally supported at one end on said frame and connected at the other end to said leaf spring means.

2. The system of claim 1 wherein the distance between the pivotal support of said arm means and the rigid connection of spring means is greater than the length of said linkage means.

3. A wheel suspension system for a wheeled vehicle having a frame, an axle and a wheel supported on said axle, said system including,
rigid arm means supporting said axle,
means pivotedly supporting one end of said arm means on said frame whereby said arm means is supported for pivotal movement toward and away from said frame,
air spring means supported on said frame and operatively connected to said arm means, and
biasing means acting between said frame means and said arm means and normally acting to bias said arm means toward said frame,
said biasing means comprises a stressable deflectable link,
means connecting said stressable link with said arm means and said frame to form a structure having three links and three revolute pairs with said stressable link providing freedom of movement of said arm means in one plane.

4. The system of claim 3 wherein said arm means includes an arm and an axle bracket,
connector bolt means connecting said axle bracket to said arm,
said connector bolt means including flexible bushing means between bracket and said arm.

5. The system of claim 3 wherein said connecting means includes means for moving one end of said link through a first arc and the other end of said link through a second arc different from said first arc as said arm means is pivoted away from said frame whereby said link is deflected to store energy in said link.

6. A suspension system for supporting a wheel of a vehicle for movement between a raised position in which the wheel is disposed above and spaced from a road and a lowered position in which the wheel engages the road to at least partially support the vehicle, said suspension system comprising rigid arm means for supporting the wheel for movement relative to a frame of the vehicle, connector means for pivotally connecting a first end portion of said arm means with the frame of the vehicle, air spring means operable from a retracted condition to an expanded condition to effect downward pivotal movement of said arm means away from the frame of the vehicle, said air spring means being connected with a second end portion of said arm means, mounting means for connecting an axle of the which with an intermediate portion of said arm means at a location between said first and second end portions of said arm means to mount said wheel for movement with said arm means, leaf spring means for moving said arm means upwardly toward the frame of the vehicle upon operation of said air spring means from the expanded condition to the retracted condition, said leaf spring means having a first end portion connected with said intermediate portion of said arm means and a second end portion connected to the frame of the vehicle to provide for a resilient stressing and storing of potential energy in said leaf spring means upon operation of said air spring means from the retracted condition to the expanded condition and pivotal of said arm means, linkage means for interconnecting said arm means, leaf spring means, and frame of the vehicle to form a structure having three pivotably interconnected links with said leaf spring means being resiliently deflectable to enable said arm means to pivot away from the frame of the vehicle under the influence of said air spring means and toward the frame of the vehicle under the influence of said leaf spring means to thereby move the wheel of the vehicle between the raised and lowered positions.

* * * * *

UNITED STATES PATENT OFFICE
CERTIFICATE OF CORRECTION

Patent No. 3,751,066     Dated August 7, 1973

Inventor(s) Gattu Narahari

It is certified that error appears in the above-identified patent and that said Letters Patent are hereby corrected as shown below:

In Column 6, line 24, delete "which" and substitute in its place -- wheel --.

Signed and sealed this 29th day of January 1974.

(SEAL)
Attest:

EDWARD M. FLETCHER, JR.
Attesting Officer

RENE D. TEGTMEYER
Acting Commissioner of Patents